United States Patent [19]

Yuasa et al.

[11] Patent Number: 5,685,368
[45] Date of Patent: Nov. 11, 1997

[54] OIL COOLER

[75] Inventors: Munenori Yuasa, Chiryu; Seiichi Kato, Kariya, both of Japan

[73] Assignee: Nippondenso Co., Ltd., Kariya, Japan

[21] Appl. No.: 570,862

[22] Filed: Dec. 12, 1995

[30] Foreign Application Priority Data

Dec. 21, 1994 [JP] Japan .................................. 6-318207

[51] Int. Cl.$^6$ ..................................................... F28F 3/08
[52] U.S. Cl. .......................... 165/167; 165/78; 165/916
[58] Field of Search ............................. 165/167, 916, 165/166, 78; 123/196 AB

[56] References Cited

U.S. PATENT DOCUMENTS

| | | | |
|---|---|---|---|
| 1,056,385 | 3/1913 | Walker | 165/167 |
| 2,528,013 | 10/1950 | Morris | 165/167 |
| 3,865,185 | 2/1975 | Ostbo | |
| 4,892,136 | 1/1990 | Khihara et al. | 165/167 X |
| 4,934,454 | 6/1990 | Vandyke et al. | |
| 5,099,912 | 3/1992 | Tajima et al. | 165/167 X |
| 5,099,915 | 3/1992 | Vandyke | |

FOREIGN PATENT DOCUMENTS

| | | | |
|---|---|---|---|
| 587784 | 1/1959 | Italy | 165/166 |
| 202997 | 9/1987 | Japan | 165/916 |
| 147787 | 5/1994 | Japan | 165/916 |
| 419707 | 8/1974 | U.S.S.R. | 165/166 |

*Primary Examiner*—Leonard R. Leo
*Attorney, Agent, or Firm*—Cushman, Darby & Cushman IP Group of Pillsbury Madison & Sutro LLP

[57] ABSTRACT

A laminated type oil cooler for cooling engine oil by using engine cooling water includes a heat exchanging portion for heat exchanging between the engine cooling water and the engine oil. The heat exchanging portion is formed by laminating a plurality of plates rotated by a predetermined angle with an adjacent plate, and each of the plates has first and second fluid holes and a fluid passage portion. The fluid passage portion communicates with the first fluid hole without communicating with the second fluid hole. The first fluid hole communicates with the second fluid hole of the adjacent plate to form two independent groups of fluid pipes. One group includes two fluid pipes for the engine oil, one pipe is connected to an inlet of an engine side bracket and the other pipe is connected to an outlet of the engine side bracket. The other group includes three fluid pipes for the engine cooling water, one pipe is connected to an inlet of a filter side bracket, another pipe is connected to an outlet of the filter side bracket, and the other pipe forms a returning portion for returning the cooling water. In this way, each fluid passage for the engine oil and for the engine cooling water is alternately formed between the adjacent plates.

9 Claims, 11 Drawing Sheets

OIL COOLER

CROSS REFERENCE TO RELATED APPLICATION

This application is based on and claims priority of Japanese Patent Application No. 6-318207 filed Dec. 21, 1994, the content of which is incorporated herein by reference.

BACKGROUND OF THE INVENTION

1. Field of the Invention

The present invention relates to an oil cooler for cooling engine oil by using, for example, engine cooling water, and more particularly to an oil cooler for a motorcycle.

2. Description of Related Art

Conventionally, as disclosed in Japanese Patent Application Laid-Open Publication No. Hei 5-332692, an oil cooler in which a plurality of plates are laminated together so that heat is exchanged between engine cooling water and engine oil has been known. The oil cooler includes a first forming plate having first communicating holes and second communicating holes and a second forming plate having corresponding first communicating holes and the second communicating holes. The first forming plate and the second forming plate are laminated so that these first communicating holes of the first and the second forming plates communicate with each other and these second communicating holes of the first and the second forming plates communicate with each other, thereby forming a heat exchanging portion. A fin plate for facilitating the heat exchange between the heat exchanging portion and a heat exchanging medium is disposed between these first and second forming plates.

In the above-described heat exchanger, three kinds of plates such as the first and the second forming plates and the fin plate are laminated together. Therefore, each of the three plates is manufactured individually by pressing. Thus, a plurality of pressing dies for these plates should be prepared.

Recently, in view of the need for a light-weight water-cooled oil cooler for a motorcycle and for an improvement in heat transfer performance, it has been tried that a stainless steel oil cooler is changed to an aluminum oil cooler. However, since aluminum is inferior to a stainless steel in terms of strength and corrosion resistance, when, for example, the oil cooler is mounted on a body of a vehicle, the oil cooler cannot withstand forces produced by fixing bolts. Therefore, it is impossible that the conventional stainless steel oil cooler can be changed to the aluminum oil cooler without changing its shape.

SUMMARY OF THE INVENTION

In view of the forgoing problems, it is a primary object of the present invention to provide an aluminum laminated-type oil cooler, which is produced by fewer kinds of pressing dies for forming plates.

According to the present invention, a laminated oil cooler for cooling engine oil by using engine cooling water, the oil cooler includes a heat exchanging portion held between a engine side bracket and a filter side bracket for heat exchanging between the engine cooling water and the engine oil. The heat exchanging portion is formed by laminating a plurality of plates rotated by a predetermined angle with an adjacent plate. Each of the plates has a first fluid hole and a second fluid hole formed at a periphery portion thereof and a fluid passage portion formed in a concave shape at a center portion thereof. The fluid passage portion communicates with the first fluid hole without communicating with the second fluid hole, and the first fluid hole communicates with the second fluid hole of the adjacent plate to form two independent fluid pipes. One pipe is connected to an inlet and an outlet of the engine side bracket and the other pipe is connected to an inlet and an outlet of the filter side bracket, so that each fluid passage for the engine oil and for the engine cooling water is alternately formed between the adjacent plates.

In the above-described oil cooler, the engine cooling water enters the oil cooler from an inlet formed at a filter side bracket. The engine cooling water enters the fluid passage portions communicating only with one of the fluid pipes, which is formed by communicating the first and the second fluid holes alternately with each other. On the other hand, the engine oil enters the oil cooler from an inlet formed at an engine side bracket and enters the other fluid passage portions formed at each plate through the other fluid pipe. Therefore, heat is exchanged between the engine cooling water and the engine oil through bottom surface of each plate. The engine cooling water and the engine oil crossflow with each other in the oil filter at a predetermined angle.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PRESENTLY PREFERRED EXEMPLARY EMBODIMENTS

The preferred embodiments of the present invention are hereinafter described with reference to the accompanying drawings.

Figure 17:
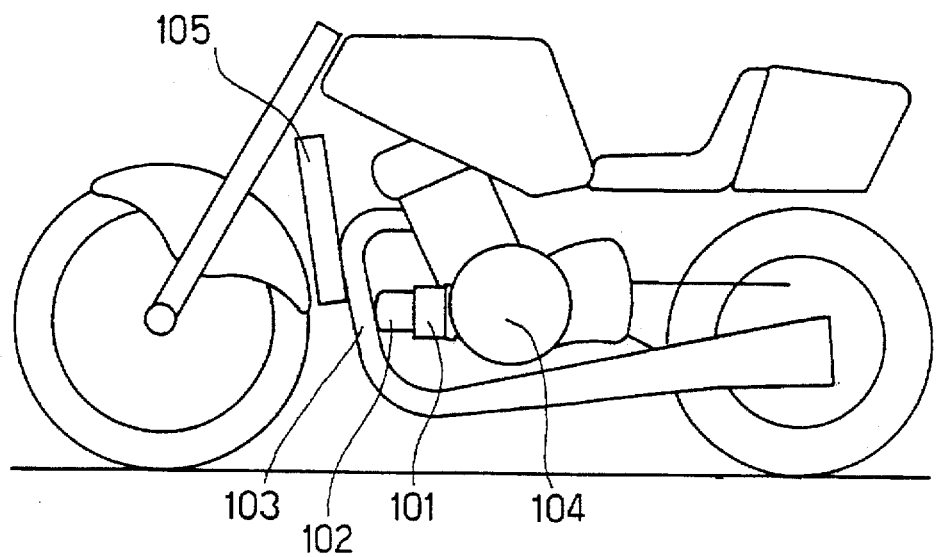
FIG. 17 is a view illustrating an oil cooler mounted on a vehicle according to the prior art.
Figure 18:
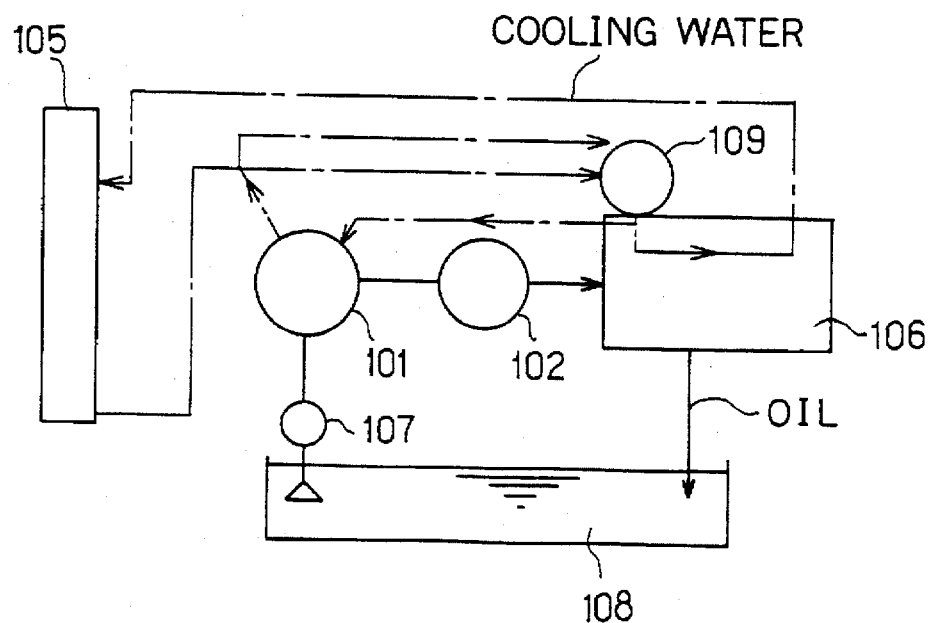
FIG. 18 is a system diagram illustrating flow of the cooling water and the oil in a prior art system.

An oil cooler is generally mounted on a motorcycle as illustrated in FIG. 17. An oil cooler 101, an oil filter 102, an exhaust pipe 103, a crankcase 104 and a radiator 105 are illustrated. FIG. 18 is a system diagram illustrating a flow of engine oil and engine cooling water in a typical cooling system. A solid line in FIG. 18 illustrates a flow of the engine oil, while a dotted line illustrates a flow of the engine cooling water. The engine oil sucked from an oil pan 108 by an oil pump 107 is cooled by heat exchange with the engine cooling water. After impurities are removed at the oil filter 102, the engine oil lubricates each sliding portion of the engine 106 and is returned back to the oil pan 108. On the other hand, the engine cooling water is circulated through the radiator 105, the engine 106 and the oil cooler 101 by a water pump 109.

Figure 1:
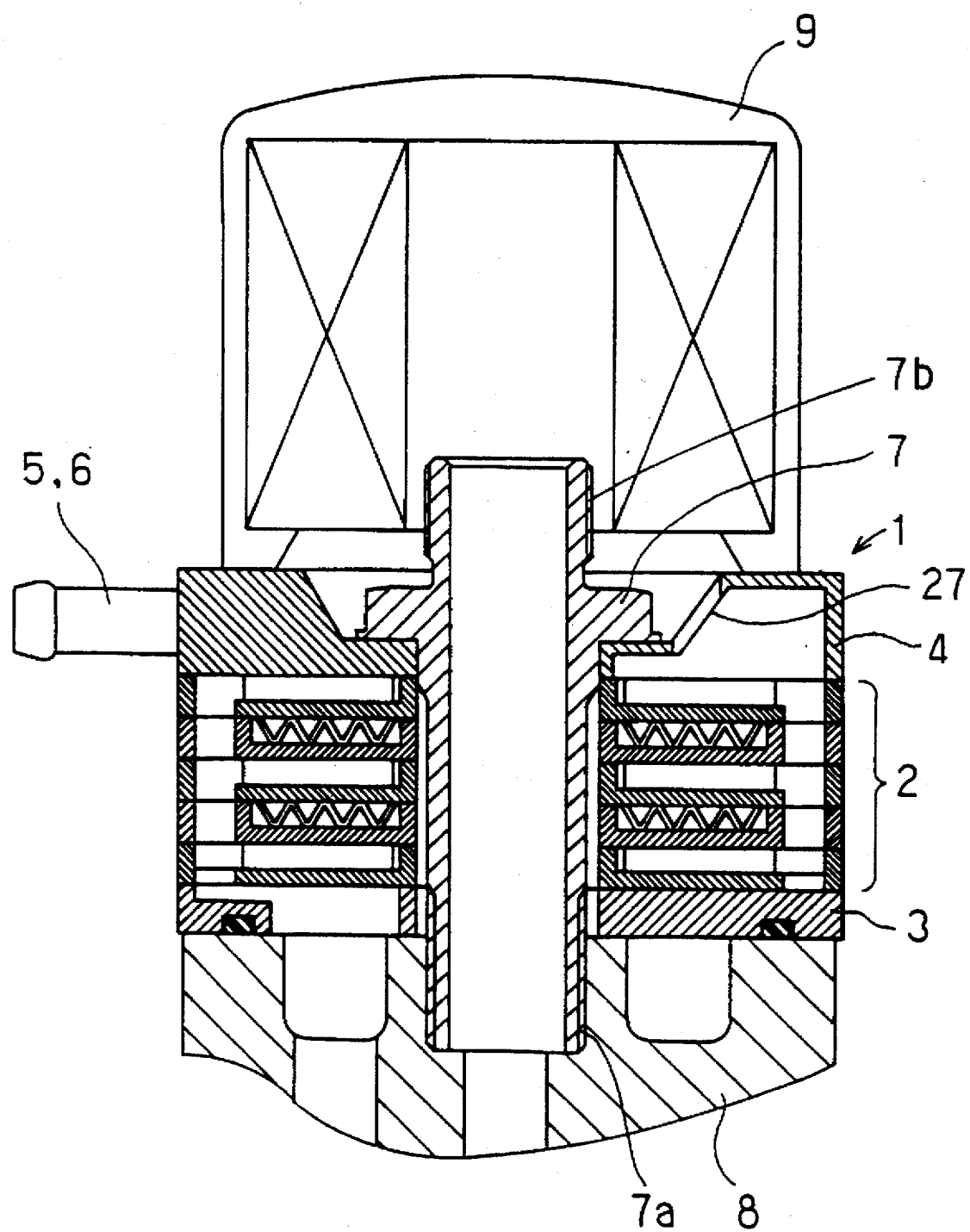
FIG. 1 is a longitudinal cross sectional view illustrating an overall structure of an oil cooler according to a first embodiment of the present invention.

FIG. 1 is a view illustrating an overall structure of the oil cooler according to a first embodiment of the present invention. The oil cooler 1 includes a heat exchanging portion 2 for cooling the engine oil by using the engine cooling water, an engine side bracket 3 mounted on an engine 8, and an oil filter side bracket 4 for installing an oil filter 9. An outer periphery of the oil filter side bracket 4 is connected to a cooling water inlet pipe 5 for leading the engine cooling water from a cooling water pipe (not shown) to the heat exchanging portion 2 and a cooling water outlet pipe 6 for returning the engine cooling water passing through the heat exchanging portion 2 to the cooling water pipe.

The oil cooler 1 is installed on the engine 8 by a bolt portion 7a using one end side of an oil cooler fixing bolt 7. On the other hand, the oil filter 9 is mounted on a bolt portion 7b using the other end side of the oil cooler fixing bolt 7.

Figure 2:
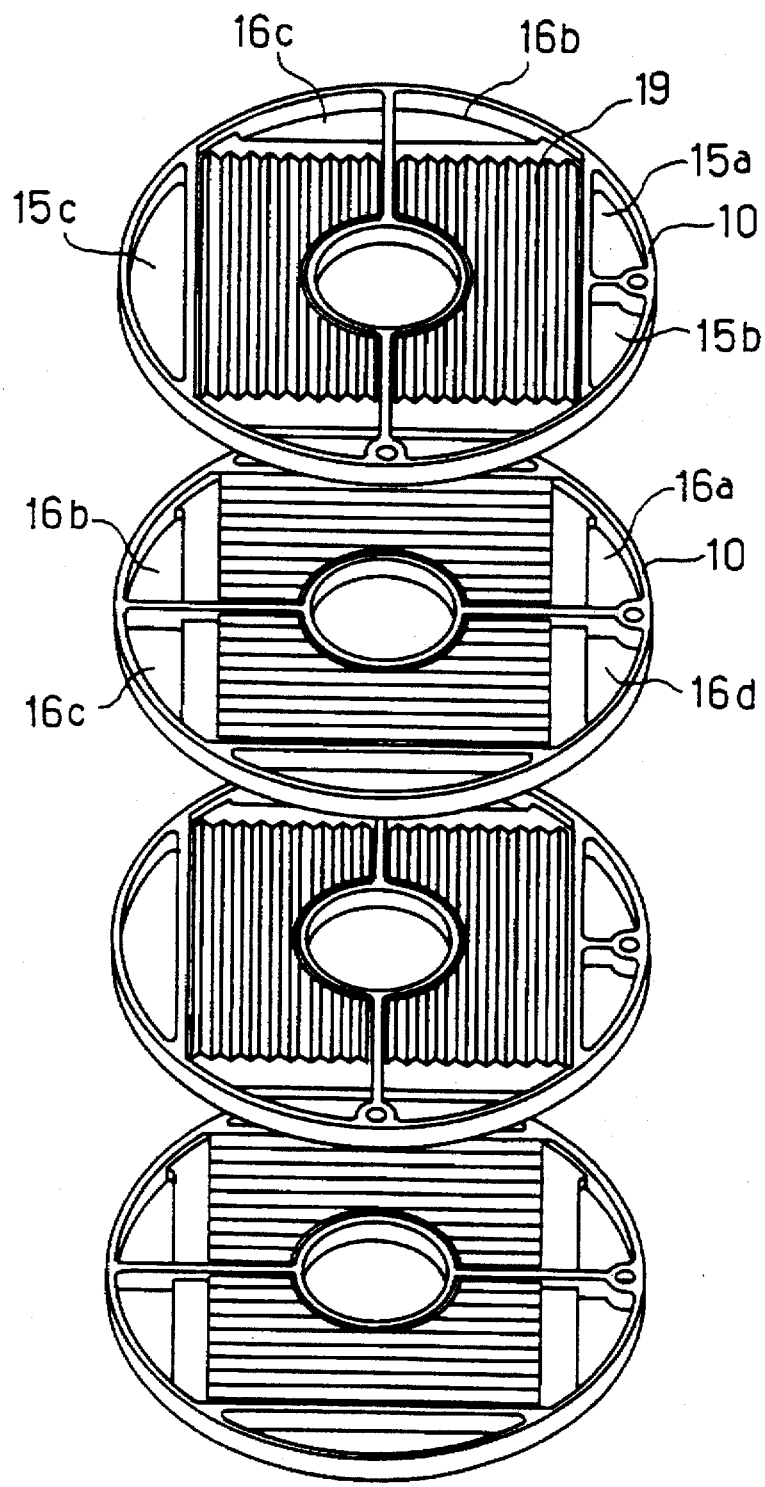
FIG. 2 is a perspective view illustrating a laminated condition of plates.
Figure 3:
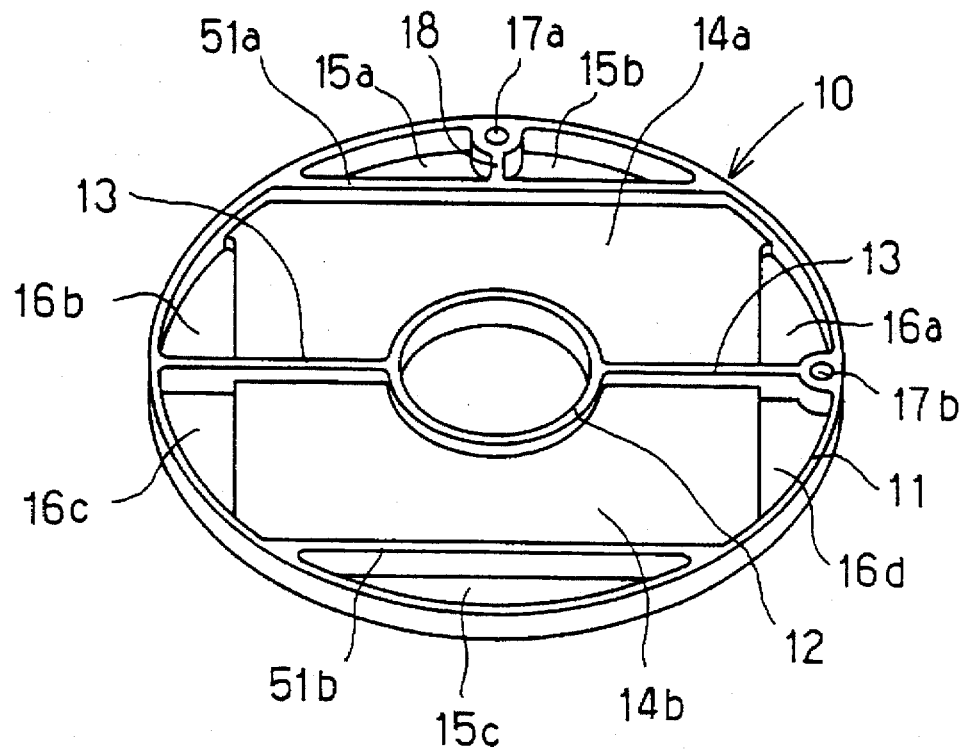
FIG. 3 is a perspective view illustrating a shape of the plate.

As illustrated in FIG. 2, the heat exchanging portion 2 is constructed by laminating plates 10 together in which relative to one another adjacent plates 10 are rotated by an angle of 90 degrees. Therefore, oil passages formed between every pair of plates 10 makes a right angle with water passages formed between them and adjacent plates 10. A shape of the plate 10 is illustrated in FIG. 3.

The plate 10 is constructed by a ring-shaped outer frame portion 11 forming the outer periphery of the heat exchanging portion 2, a ring-shaped inner frame portion 12 forming an inner periphery of the heat exchanging portion 2, center connecting portions 13 radially connecting between the outer frame portion 11 and the inner frame portion 12, side connecting portions 51a and 51b extending in parallel with the connecting portions 13 and facing each other to hold the center connecting portions 13 therebetween, and two fin receiving concave portions 14a and 14b surrounded by these frame portions 11 and 12 and the connecting portions 13, 51a and 51b. The plate 10 is made of a metal such as an aluminum alloy and is formed by, for example, a press stamping.

A first fluid hole 15 is formed by the outer frame portion 12 and the side connecting portion 51. One of two first fluid holes 15 which is defined by the side connecting portion 51a, is halved into two fluid holes 15a and 15b by a connecting piece 18. A fluid hole defined by the one-side connecting portion 51b is a single fluid hole 15c without being divided into two holes.

Figure 4:
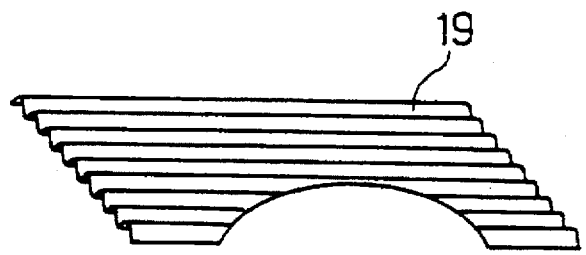
FIG. 4 is a perspective view illustrating a shape of an inner fin.

A second fluid hole 16 is provided in a position shifted from the first fluid hole 15 by the angle of 90 degrees in the circumferential direction. The second fluid hole 16 is divided into fluid holes 16a, 16b and 16c by the center connecting portion 13. As illustrated in FIG. 4, inner fins 19 are received on the fin receiving concave portion 14 along a longitudinal direction of the center connecting portion 13 to improve heat radiating performance and to receive a load caused by the fixing part of bolt 7.

Figure 5:
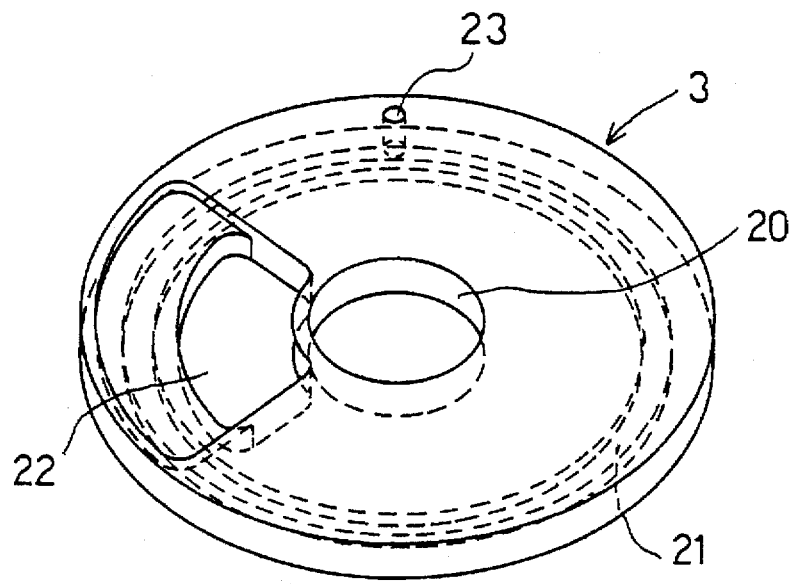
FIG. 5 is a perspective view illustrating an engine side bracket.

As illustrated in FIG. 5, the engine side bracket 3 has a fitting hole 20 for inserting a bolt. Moreover, the engine side bracket 3 has a groove 21 for an O-ring, an oil inlet hole 22 and a positioning hole 23 around the engine side bracket 3.

Figure 6:
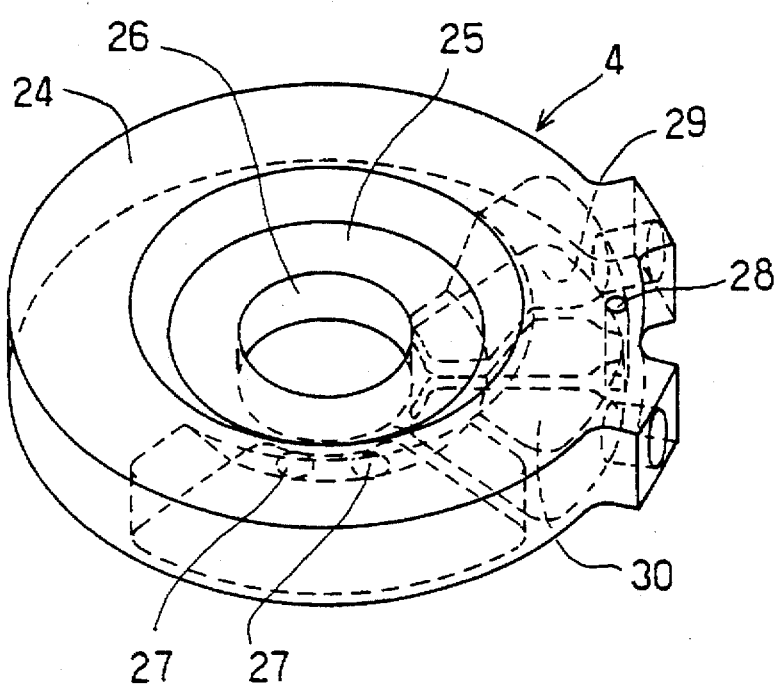
FIG. 6 is a perspective view illustrating a filter side bracket.

As illustrated in FIG. 6, a top surface portion of the oil filter side bracket 4 is a seat surface 24 for seating an oil filter in a manner to be in contact with the oil filter 9. At a center portion of the oil filter side bracket 4, a seat surface 25 for a bolt at one step down from the oil filter base 24 is provided in a manner to be in contact with the fixing bolt 7. Each of a fitting hole 26 for inserting a bolt, an oil outlet hole 27 and a positioning hole 28 is formed at a center and a periphery portions of the oil filter side bracket 4. Further, a cooling water inlet chamber 29 communicating with the cooling water inlet pipe 5 and a cooling water outlet chamber 30 communicating with the cooling water outlet pipe 6 are formed at the oil filter side bracket 4.

Next, an operation of the above-described oil cooler 1 according to the first embodiment of the present invention is explained.

Figure 7:
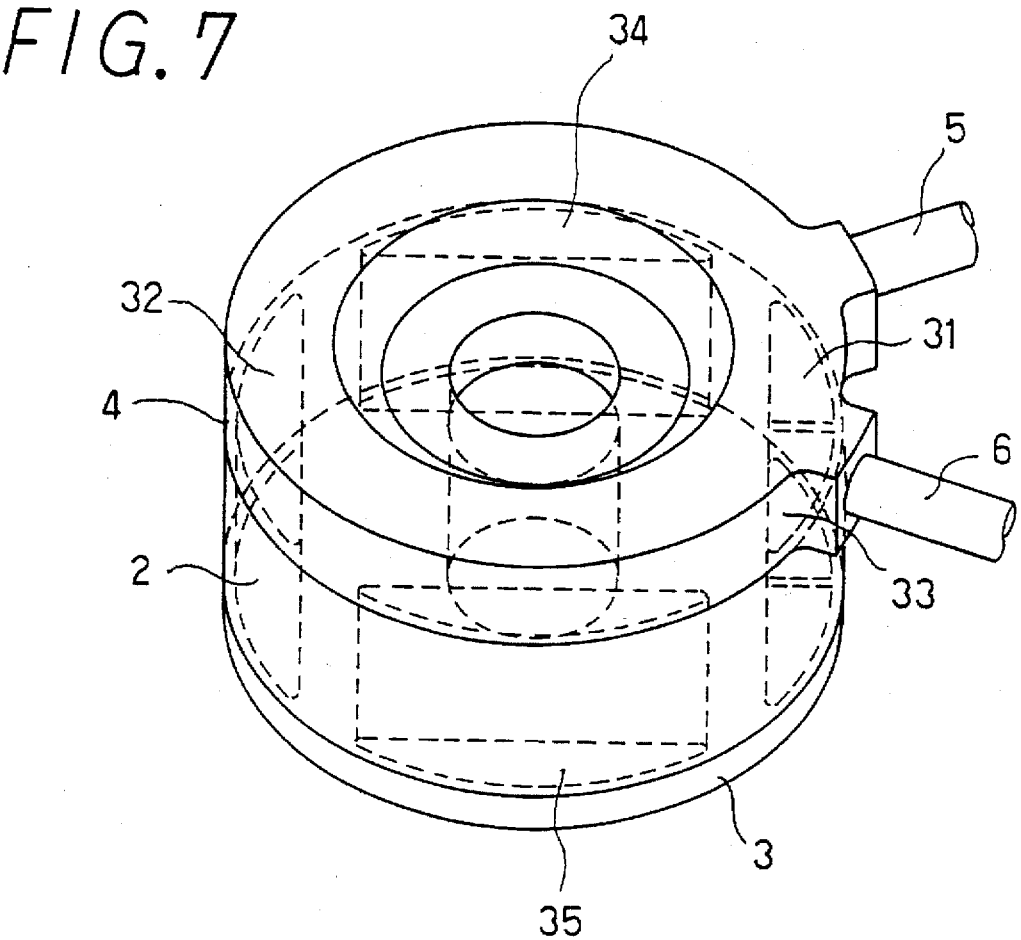
FIG. 7 is a perspective view illustrating an outer shape of a main portion of a heat exchanging portion of each bracket.
Figure 8:
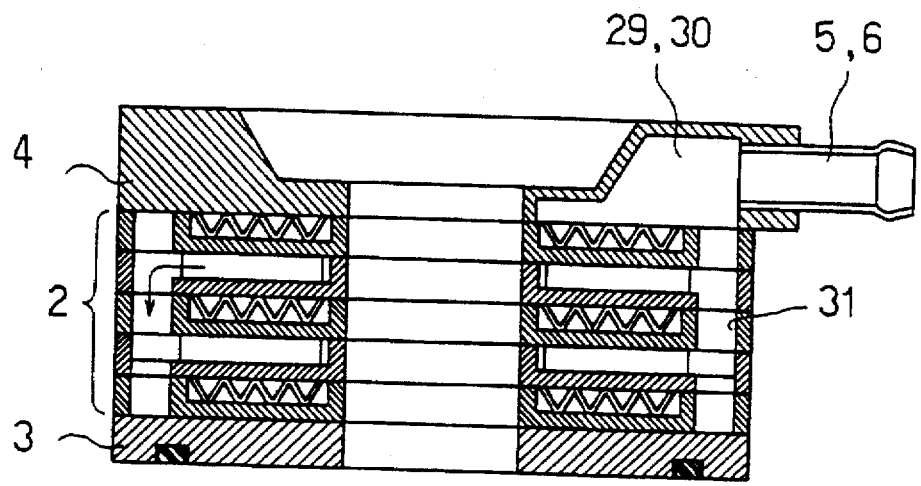
FIG. 8 is a cross sectional view illustrating a flow of cooling water.
Figure 9:
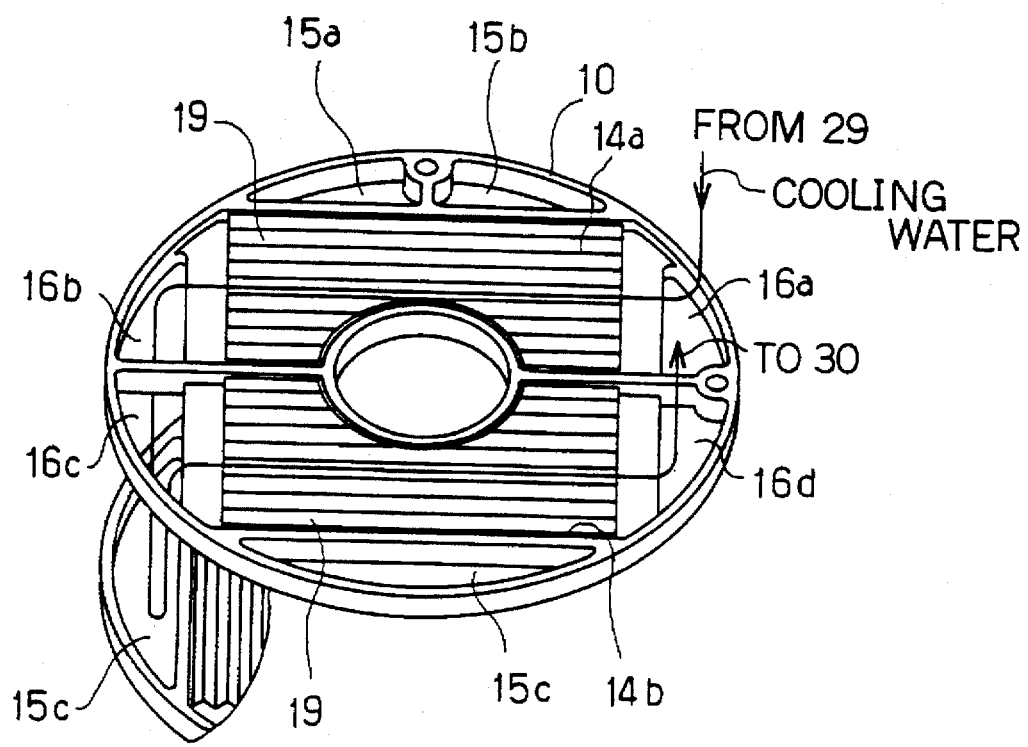
FIG. 9 is a view illustrating a laminated condition of plates to explain the flow of the cooling water.

The flow of the cooling water is explained with reference to FIGS. 7 through 9. FIG. 7 is a perspective view illustrating an outer shape of the assembly composed of the filter side bracket 4 of the oil cooler 1, the heat exchanging portion 2 and the engine side bracket 3. FIG. 8 is a cross-sectional view of the assembly illustrated in FIG. 7. FIG. 9 is a view where a selected portion of the laminated plates 10 constructing the heat exchanging portion 2 is taken out.

The cooling water introduced to the cooling water inlet chamber 29 of the oil filter side bracket 4 from the cooling water inlet pipe 5 flows into the fin receiving concave portion 14a from the fluid hole 16a positioned at every other plate 10 through the cooling water inlet passage 31 formed by communicating the fluid hole 15a with the fluid hole 16a of the plates 10, which are laminated while being rotated by the angle of 90 degrees relative to the adjacent plate 10. The cooling water flowing between the inner fins 19 received on the fin receiving concave portion 14a reaches a fluid hole 16b on an opposite side and is gathered at a cooling water turning pipe 32 constructed by the fluid holes 16b and 15c. The cooling water gathered at the cooling water turning pipe 32, after passing through the fin receiving concave portion 14a of each plate, flows down in the cooling water turning pipe 32, turns around on a top surface portion of the engine side bracket 3 positioned at the bottom-most portion, and flows into each fin receiving concave portion 14b formed between the plates 10 from the fluid hole 16c positioned at every other plate 10. After passing through the inner fins 19 received on the fin receiving concave portion 14b, the cooling water flows into the cooling water outlet chamber 30 in the oil filter side bracket 4 through a cooling water outlet pipe 33 formed by the fluid holes 16b and 15b, and then the cooling water is discharged out of the oil filter 1 from the cooling water outlet pipe 6.

Figure 11:
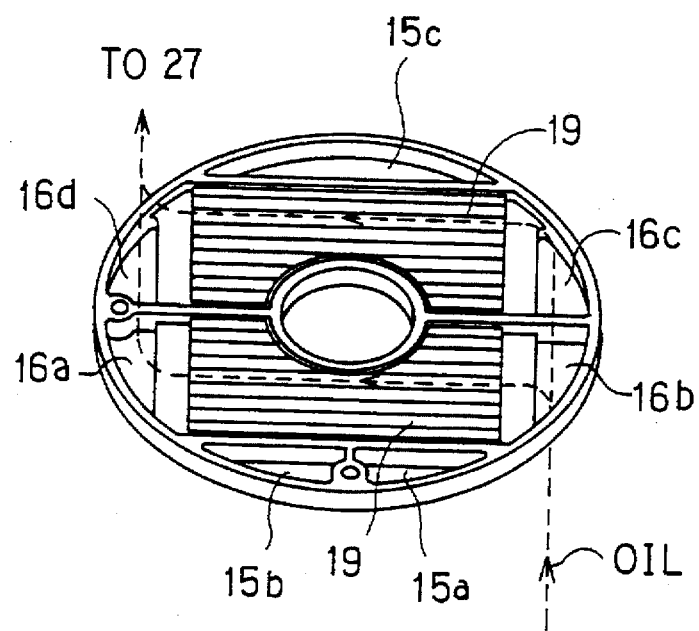
FIG. 11 is a view illustrating a plate to explain the flow of the oil.
Figure 10:
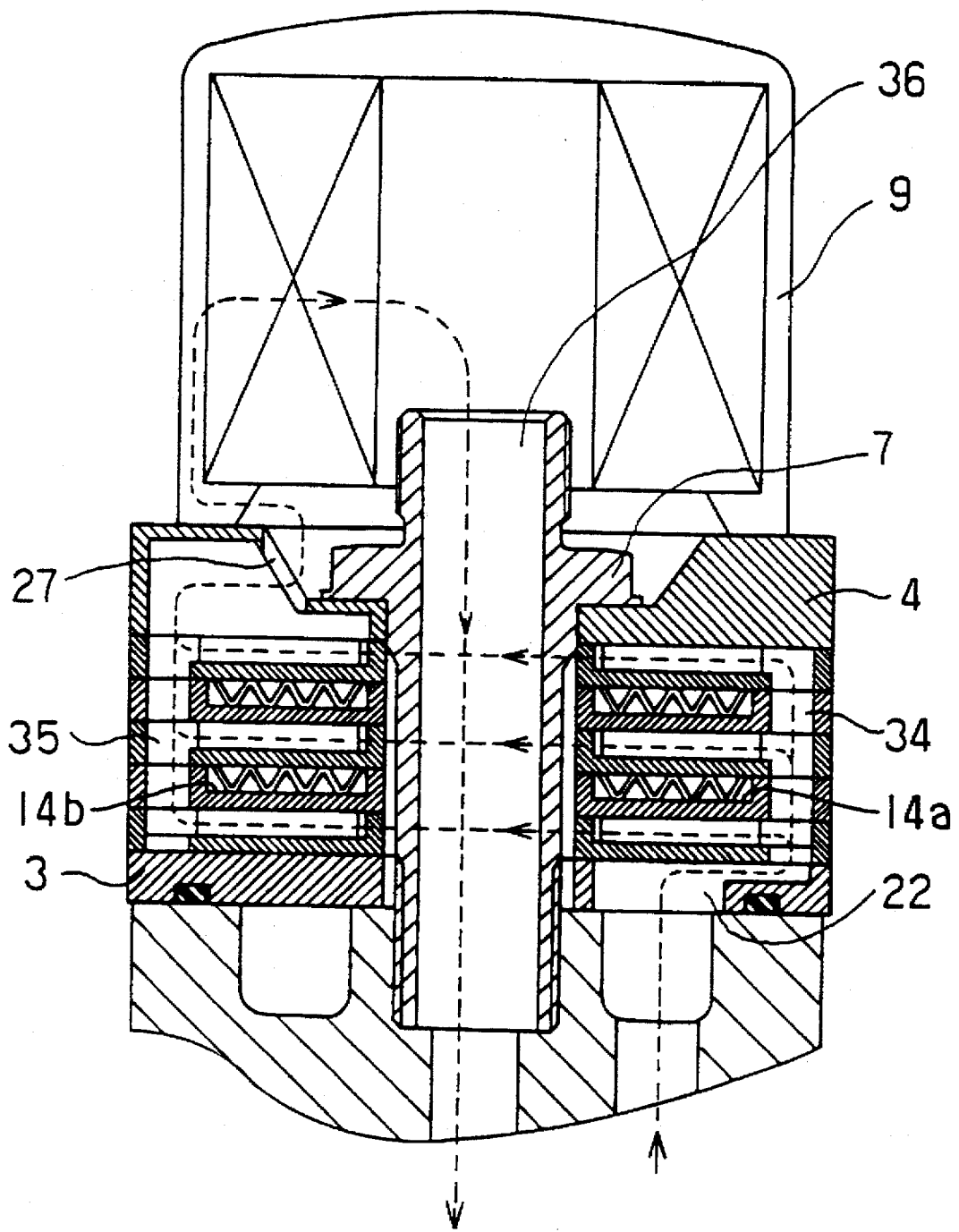
FIG. 10 is a cross sectional view illustrating a flow of an oil.

The flow of the oil is explained with reference to FIGS. 10 and 11. FIG. 10 is a cross-sectional view illustrating the oil cooler 1, which is a view of a side opposite the one shown in with FIG. 1. FIG. 11 is a perspective view illustrating the plate 10 shown in FIG. 10. The oil flowing from an oil inlet hole 22 of the engine side bracket 3 is introduced to an oil inlet pipe 34 constructed by communicating the fluid holes 16b, 16c and 15c with one another by laminating the plates 10 together while they are rotated by the angle of 90 degrees with adjacent plates 10. The oil flows into the fin receiving concave portions 14a and 14b of each plate 10 from the fluid holes 16b and 16c existing at every other plate 10 and reaches the fluid holes 16a and 16b at the opposite side after passing through the inner fins 19 received on the fin receiving concave portions 14a and 14b. At the opposite side of the oil inlet pipe 34, an oil outlet pipe 35 is formed by the fluid holes 16a, 15a and 15b. The oil passing through the fin receiving concave portions 14a and 14b at every other plate 10 is gathered at the oil outlet pipe 35 and introduced to the oil filter 9 disposed at a top portion of the oil cooler 1 through the oil outlet hole 27 formed at the filter side bracket 4. The oil filtered at the oil filter 9 returns to the engine 8 through a center hole 36 of the assembly bolt 7.

Thus, the cooling water and the oil flow cross each other through the adjacent fin receiving concave portions 14 of the laminated plates 10 and exchange heat with each other through the bottom surface of the fin receiving concave portion 14.

Figure 12:
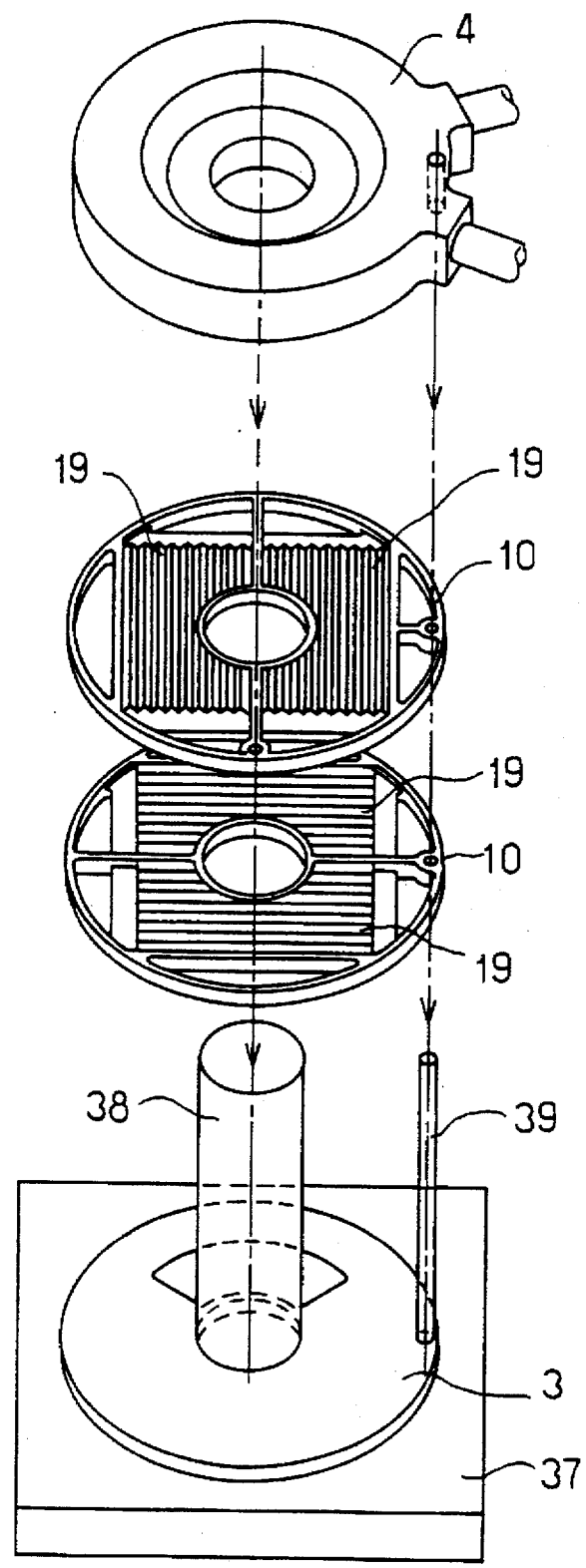
FIG. 12 is an exploded view illustrating a method for manufacturing the oil cooler according to the present invention.

Next, a manufacturing method of the oil cooler 1 is explained with reference to FIG. 12. The engine side bracket 3 is inserted into an assembly jig 37 having a positioning bar 38 having the same diameter as the fitting hole 26 for inserting the bolt of each part and a positioning bar 39 inserted into the positioning hole of each part. The plurality of plates 10 are laminated together while every plate 10 is rotated by the angle of 90 degrees. The inner fins 19 and the oil filter side bracket 4 are laminated thereto. Then, the oil cooler 1 is temporarily assembled by being fixedly held with a jig for brazing or the like. After a front surface of the plate 10 and the inner fins 19 are cladded with an aluminum wax material, the oil cooler 1 is integrally brazed in a vacuum furnace.

Figure 13A:
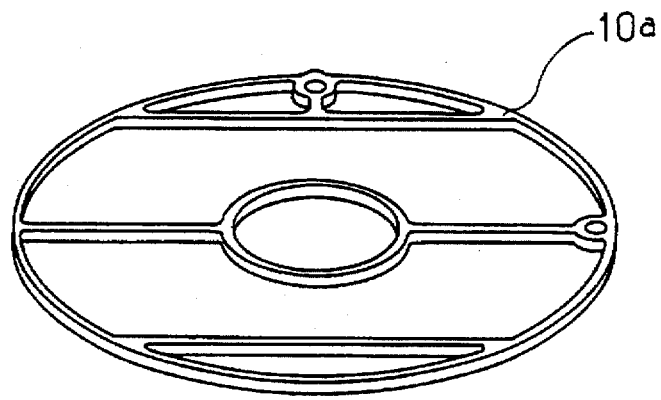
FIGS. 13A and 13B are views illustrating a second embodiment of the present invention.
Figure 13B:
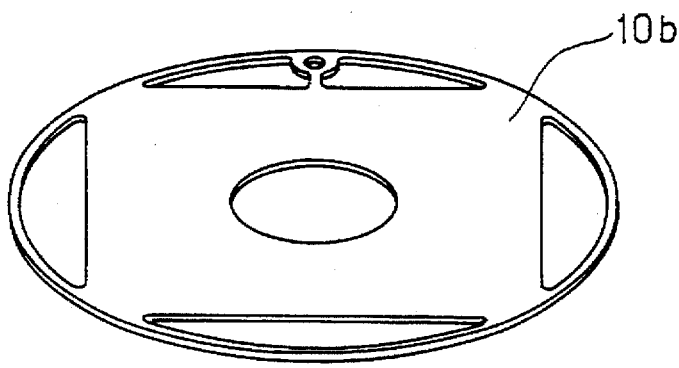

A second embodiment of the oil cooler 1 according to the present invention is explained below with reference to FIGS. 13A and 13B. The fin receiving concave portion 14 of the plate 10 is divided into a frame portion 10a and a bottom portion 10b in a horizontal direction. These plates 10a and 10b each having passage holes are individually manufactured. Therefore, each plate is manufactured by a simple stamping die. Although the number of parts is increased, cost of the parts is reduced greatly, and the overall cost can be reduced. The plate 10a functions as a spacer and the plate 10b functions as a separator.

Figure 14A:
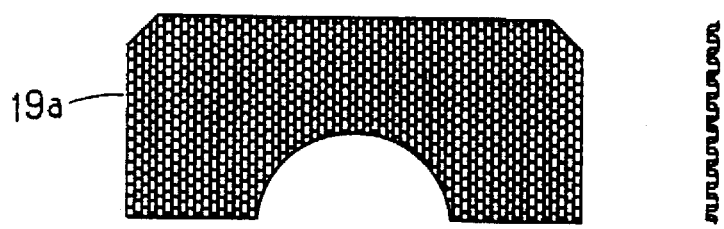
FIGS. 14A and 14B are views illustrating a third embodiment of the present invention.
Figure 14B:
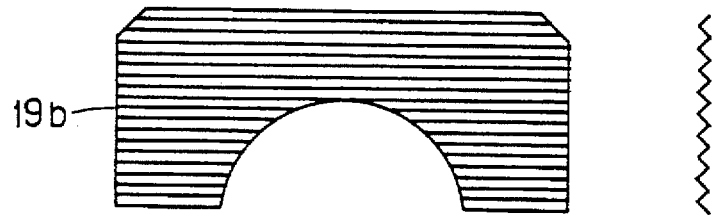

A third embodiment is explained with reference to FIGS. 14A and 14B. A shape of the inner fins 19 is modified depending on the kind of fluid used in the heat exchange process. By using an inner fin 19a for the oil and an inner fin 19b for the cooling water, the heat radiating performance and flowing resistance at passages are adjusted appropriately.

Figure 15:
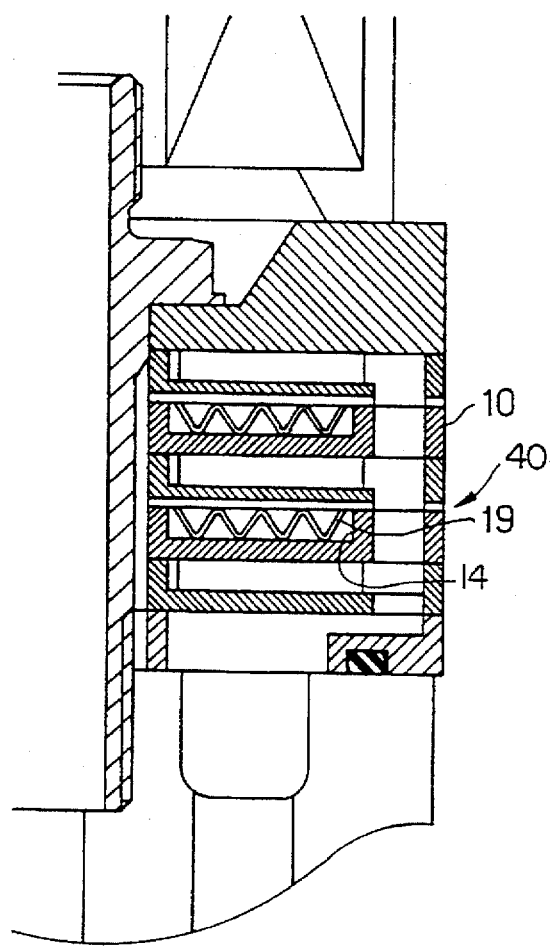
FIG. 15 is a cross-sectional view illustrating a conventional oil cooler.
Figure 16:
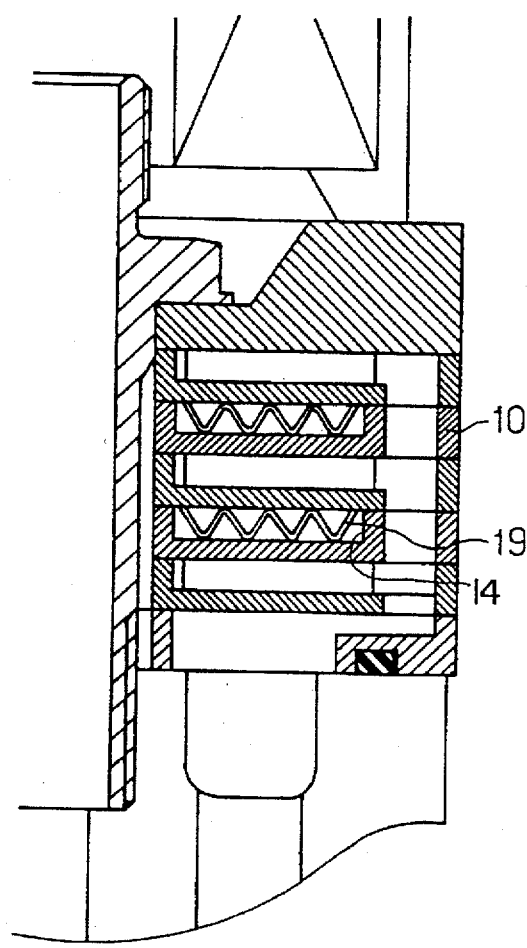
FIG. 16 is a cross-sectional view illustrating a fourth embodiment according to the present invention.

A fourth embodiment according to the present invention is explained with reference to FIG. 16. As illustrated in FIG. 16, by using an aluminum alloy having lower electric potential than the plate 10, a sacrifice corrosiveness is provided on the inner fins 19 through which the cooling water passes. Therefore, a hole can be prevented from being formed at the bottom surface of the corrosive layer is not provided on the bottom surface of the fin receiving concave portion 14 of the plate 10. In the conventional method shown in FIG. 15, since a sacrifice corrosive material is provided on the bottom surface of the fin receiving concave portion 14 of the plate 10 as a sacrifice corrosive layer 40, when the corrosion is advanced, a joint portion of the plate 10 may be broken. However, in the present embodiment shown in FIG. 16, since the sacrifice corrosion is prevented by providing lower electric potential on the inner fins 19 than at the plate 10, the sacrifice corrosive material does not cross the joint portion of the plate 10. As a result, the joint portion of the plate 10 is not broken due to the sacrifice corrosion.

As described above, since the oil cooler according to the present invention is constructed by laminating together plates each having same shape while being rotated by a predetermined angle, the engine cooling water and the engine oil can alternately flow into the fin receiving concave portions formed at each plate, and heat exchange can be performed between those fin receiving concave portions. Since only one kind of plate is used for the oil cooler, the cost for manufacturing plates can be minimized. Since the fin receiving concave portions are formed at each plate and inner fins are received and plates are laminated while being rotated by a predetermined angle, the oil cooler can withstand a load caused by the assembly bolt when the oil cooler is mounted on a body of a vehicle. Moreover, when the plate is formed into a shape having an outer and an inner frame portions, the load is effectively held by the two frame portions. Therefore, instead of the conventional stainless steel oil cooler, a light-weight aluminum oil cooler can be manufactured.

The present invention having been described should not be limited to the disclosed embodiments, but it may be modified in many other ways without departing from the scope and the spirit of the invention. Such changes and modifications are to be understood as being included with the scope of the present invention as defined by the appended claims.

What is claimed is:

1. A laminated oil cooler for cooling engine oil by using engine cooling water, said oil cooler comprising:

an engine side bracket having an inlet and an outlet for said engine oil, said engine side bracket being arranged to be mounted on an engine;

a filter side bracket having an inlet and an outlet for said engine cooling water, said filter side bracket being arranged to connect with an oil filter for filtering impurities of said engine oil; and a heat exchanging portion held between said engine side bracket and said filter side bracket for heat exchanging between said engine cooling water and said engine oil, wherein said heat exchanging portion is formed by laminating a plurality of plates rotated by 90° relative to an adjacent plate, each of said plates having first fluid holes and second fluid holes formed at a periphery portion thereof and a fluid passage portion formed in a concave shape at a center portion thereof, said fluid passage portion communicating with said second fluid holes without communicating with said first fluid holes, at least one of said first fluid holes communicating with at least one of said second fluid holes of the adjacent plate to form two independent fluid pipes, one pipe being connected to said inlet and said outlet of said engine side bracket and the other pipe being connected to said inlet and said outlet of said filter side bracket, so that each fluid passage for said engine oil and said engine cooling water is alternately formed between the adjacent plates, wherein each of said plurality of plates has a circular shape and each of said plates has a ring-shaped outer frame portion forming an outer wall portion of said heat exchanging portion, a ring-shaped inner frame portion forming an inner periphery wall of said heat exchanging portion, and a connecting portion partitioning each fluid passage portion into two fluid passages;

the second fluid holes which communicate with the fluid passage portion are symmetric with each other with reference to a center axis;

one of said first fluid holes which is free from communication with fluid passage being partitioned by a connecting piece into first and second holes and a diametrically opposed first fluid hole being provided as a non-partitioned hole, said first fluid holes being positioned so as to be respectively rotated from the second fluid holes by 90°, a position of the connecting portion of a plate corresponding to a position of the connecting piece of the adjacent plate.

2. The laminated oil cooler according to claim 1, wherein inner fins are provided on said fluid passage portion to facilitate heat exchanging performance.

3. The laminated oil cooler according to claim 2, wherein said inner fins have lower electric potential than said plates.

4. The laminated oil cooler according to claim 1, wherein each of said plurality of plates has a first positioning hole and a second positioning hole at a periphery portion thereof to determine a laminating direction, and said second positioning hole is provided at a position rotated by an angle of 90 degrees from said first positioning hole.

5. The laminated oil cooler according to claim 1, wherein each of said plurality of plates includes a first plate forming a frame portion having said fluid passage portion and a second plate forming a bottom portion thereof.

6. The laminated oil cooler according to claim 1, wherein said laminated oil cooler is made of aluminum.

7. The laminated oil cooler according to claim 1, wherein oil flows through a first pair of said symmetrical second holes through the partitioned fluid passage toward a second pair of said symmetric second holes whereby the oil passes through the two fluid passages of the partitioned fluid passage portion in one direction; and wherein cooling water is directed to pass in opposite directions through the two fluid passages of the partitioned fluid passage portion.

8. A laminated oil cooler as in claim 7, wherein cooling water passes through one of the two fluid passages of one plate, passes through a said second fluid hole of the one plate to the non-partitioned first fluid hole of an adjacent plate, passes through another said second fluid hole of said one plate and then passes through the other of the two fluid passages.

9. The laminated oil cooler according to claim 1, wherein the second fluid holes are partitioned by said connecting portion into two pairs of holes, a said pair of holes being disposed at diametrically opposite ends of said fluid passage portion.

* * * * *